United States Patent
Stickelmaier et al.

(10) Patent No.: US 9,368,983 B2
(45) Date of Patent: Jun. 14, 2016

(54) AUTONOMOUS LITHIUM-ION BATTERY PROTECTION

(75) Inventors: John F. Stickelmaier, El Segundo, CA (US); Allen R. Powers, El Segundo, CA (US)

(73) Assignee: THE BOEING COMPANY, Chicago, IL (US)

( * ) Notice: Subject to any disclaimer, the term of this patent is extended or adjusted under 35 U.S.C. 154(b) by 931 days.

(21) Appl. No.: 13/327,570

(22) Filed: Dec. 15, 2011

(65) Prior Publication Data

US 2013/0154541 A1    Jun. 20, 2013

(51) Int. Cl.
*H02J 7/00*       (2006.01)
*H02J 7/35*       (2006.01)

(52) U.S. Cl.
CPC ............. *H02J 7/0031* (2013.01); *H02J 7/35* (2013.01); *H02J 2007/004* (2013.01); *H02J 2007/0037* (2013.01); *Y02E 10/566* (2013.01)

(58) Field of Classification Search
USPC .......................................................... 320/101
See application file for complete search history.

(56) References Cited

U.S. PATENT DOCUMENTS

| | | | |
|---|---|---|---|
| 3,740,636 A * | 6/1973 | Hogrefe et al. ............... | 320/101 |
| 5,957,408 A * | 9/1999 | Hall et al. ....................... | 429/50 |
| 6,246,217 B1 * | 6/2001 | Yoshida et al. ............... | 320/150 |
| 2011/0095720 A1 * | 4/2011 | Shacklette et al. ............ | 320/101 |

FOREIGN PATENT DOCUMENTS

| | | |
|---|---|---|
| CN | 1267116 A | 9/2000 |
| CN | 1719688 A | 1/2006 |
| JP | 11-150885 A | 6/1999 |

OTHER PUBLICATIONS

Office Action from Chinese Patent Office for corresponding Chinese Patent Application No. 2012105456204, prepared on Dec. 1, 2015.

* cited by examiner

*Primary Examiner* — Robert Grant
(74) *Attorney, Agent, or Firm* — Vista IP Law Group LLP; Cynthia A. Dixon

(57) ABSTRACT

A method, system, and apparatus are disclosed for autonomous lithium-ion battery protection. In particular, the present disclosure teaches a system that provides for automatic protection of lithium-ion batteries from damage due to deep discharge and, in some embodiments, from recharging in low temperatures. The disclosed system employs internal logic, autonomous switches and, in some embodiments, heaters to protect the battery without any need for spacecraft monitoring or control intervention. The system uses one or more dedicated strings of solar array cells to, in some embodiments, preheat, and to recharge the battery. The system is completely self contained in the battery with the only additional interface being for the string(s) of the solar array cells that are used to provide dedicated and reliable power to the system.

29 Claims, 8 Drawing Sheets

AUTONOMOUS LITHIUM-ION BATTERY PROTECTION

FIELD

The present disclosure relates to battery protection. In particular, it relates to autonomous lithium-ion battery protection.

BACKGROUND

Currently, spacecraft control algorithms are used to prevent complete discharge of the spacecraft batteries. However, in the past, failure of these protection algorithms has allowed the spacecraft batteries to become completely discharged, such that they may become damaged.

SUMMARY

The present disclosure relates to an apparatus, system, and method for autonomous lithium-ion battery protection. In one or more embodiments, an autonomous regulation method for a battery is disclosed. The disclosed method involves sensing, with a sensor, the voltage of the battery. The method further involves comparing, with a processor, the voltage of the battery with a preset voltage for the battery. In addition, the method involves switching, with switch logic, a very low resistance non-electromagnetic actuator (NEA) switch to an open position to disconnect the battery from a bus circuit and switching, with the switch logic, a low resistance relay switch to connect the battery to a dedicated charging circuit, when the processor determines that the voltage of the battery is below the preset voltage. Further, the method involves switching, with the switch logic, the relay switch to connect the battery to the bus circuit, when the processor determines that the voltage of the battery exceeds the preset voltage.

In one or more embodiments, the dedicated charging circuit comprises at least a portion of a solar array. In at least one embodiment, the portion of the solar array is at least one string of solar cells. In some embodiments, the battery, the sensor, the processor, the switch logic, the NEA switch, and/or the relay switch are housed together in a single unit. In one or more embodiments, the battery is on a spacecraft. In some embodiments, the battery is a lithium-ion battery.

In at least one embodiment, an autonomous regulation system for a battery is disclosed. The disclosed system involves a sensor configured to sense the voltage of the battery. The system further involves a processor configured to compare the voltage of the battery with a preset voltage for the battery. In addition, the system involves switch logic configured to switch a very low resistance non-electromagnetic actuator (NEA) switch to an open position to disconnect the battery from a bus circuit, and configured to switch a low resistance relay switch to connect the battery to a dedicated charging circuit, when the processor determines that the voltage of the battery is below the preset voltage. Additionally, the system involves switch logic that is further configured to switch the relay switch to connect the battery to the bus circuit, when the processor determines that the voltage of the battery exceeds the preset voltage.

In one or more embodiments, an autonomous regulation method for a battery is disclosed that involves sensing, with a voltage sensor, the voltage of the battery. The method further involves comparing the voltage of the battery with a preset voltage for the battery. Also, the method involves switching, with switch logic, a bus circuit switch to disconnect the battery from a bus circuit when the voltage of the battery is below the preset voltage. In addition, the method involves sensing, with a temperature sensor, the temperature of the battery. Additionally, the method involves comparing the temperature of the battery with a threshold temperature for the battery.

The method further involves switching a second thermal switch to disconnect the battery from a dedicated power source, and switching a first thermal switch to connect a battery heater to the dedicated power source, when the temperature of the battery is below the threshold temperature. Further, the method involves switching the first thermal switch to disconnect the battery heater from the dedicated power source, and switching the second thermal switch to connect the battery to the dedicated power source, when the temperature of the battery exceeds the threshold temperature. In at least one embodiment, the battery, the voltage sensor, the temperature sensor, the switch logic, the bus circuit switch, the first thermal switch, the second thermal switch, and/or the battery heater are housed together in a single unit.

In at least one embodiment, an autonomous regulation system for a battery is disclosed that involves a voltage sensor configured to sense the voltage of the battery. The system further involves a first processor configured to compare the voltage of the battery with a preset voltage for the battery. Also, the system involves switch logic configured to switch a bus circuit switch to disconnect the battery from a bus circuit when the first processor determines that the voltage of the battery is below the preset voltage.

In addition, the system involves a temperature sensor configured to sense the temperature of the battery. Additionally, the system involves a second processor configured to compare the temperature of the battery with a threshold temperature for the battery. The system further involves a second thermal switch configured to disconnect the battery from a dedicated power source, and a first thermal switch configured to connect a battery heater to the dedicated power source, when the second processor determines that the temperature of the battery is below the threshold temperature.

Additionally, the first thermal switch is further configured to disconnect the battery heater from the dedicated power source, and the second thermal switch further configured to connect the battery to the dedicated power source, when the second processor determines that the temperature of the battery exceeds the threshold temperature. In one or more embodiments, the battery, the voltage sensor, the first processor, the second processor, the temperature sensor, the switch logic, the bus circuit switch, the first thermal switch, the second thermal switch, and/or the battery heater are housed together in a single unit. In some embodiments, the second processor is the first processor (i.e. they are the same processor).

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for autonomous lithium-ion battery protection. In one or more embodiments, the battery (or battery pack) is on a spacecraft, such as a satellite. However, in other embodiments, the battery may be employed in other devices or vehicles, such as terrestrial devices or vehicles. Specifically, the system employs a protection circuit contained inside of the battery (or battery pack) to autonomously disconnect the battery from the spacecraft if it is in danger of being damaged through complete discharge.

The disclosed protection circuit includes internal logic, autonomous switches and, in at least one embodiment, heaters to protect the battery without any need for intervention of spacecraft monitoring or control. The disconnect function is fully autonomous and does not depend on any control or activation signal from outside of the battery pack. The logic is self contained within the battery pack, and does not depend on external signals for activation or reconnections. The protection circuit uses one or more dedicated strings of solar array cells to, in one or more embodiments, preheat, and to recharge the battery. The protection circuit is completely self contained in the battery with the only additional interface being for the string(s) of the solar array cells that are used to provide dedicated and reliable power to the system.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
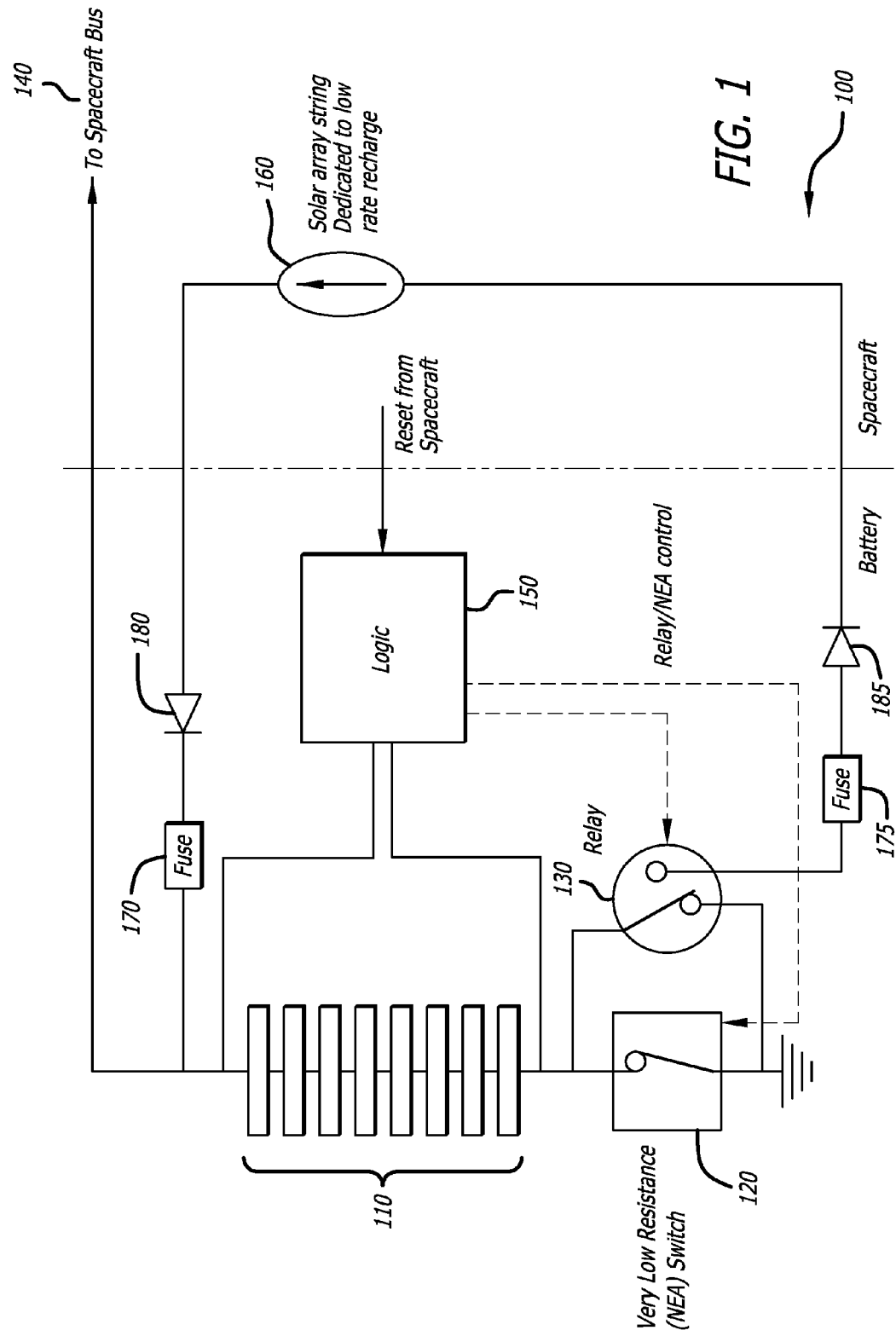
FIG. 1 is a block diagram of the disclosed system for autonomous lithium-ion battery protection with the switches in the initial position for normal charging and discharging of the battery, in accordance with at least one embodiment of the present disclosure.

FIG. 1 is a block diagram of the disclosed system for autonomous lithium-ion battery protection with the switches 120, 130 in the initial position for normal charging and discharging of the battery 110, in accordance with at least one embodiment of the present disclosure. In this figure, the system 100 is shown to include a battery 110, a spacecraft bus (i.e. a bus circuit) 140, switch logic 150, a very low resistance non-electromagnetic actuator (NEA) switch 120, a low resistance relay switch 130, fuses 170, 175, diodes 180, 185, and a solar array string that is dedicated to a low rate of recharge (i.e. a dedicated charging circuit) 160.

In one or more embodiments, the battery 110 is a lithium-ion battery. It should be noted that in some embodiments, the system 100 employs a battery pack for the battery 110. In addition, it should be noted that in one or more embodiments, the system 100 employs at least a portion of a solar array for the dedicated charging circuit 160. In some embodiments, one or more strings of solar array cells are employed by the system 100 for the dedicated charging circuit 160. In at least one embodiment, the battery 110, the switch logic 150, a processor (not shown), a sensor (not shown), the NEA switch 120, the relay switch 130, the fuses 170, 175, and/or the diodes 180, 185 are housed together in a single protection circuit unit. It should be noted that in some embodiments, the processor (not shown) and the sensor (not shown) are included in the switch logic 150.

During normal operation of the system 100, the battery 110 is connected to the bus circuit 140 to allow for charging and discharging of the battery 110 through the bus circuit 140. The configuration of the switches 120, 130 for normal operation is as shown in FIG. 1, where the NEA switch 120 is closed, and the relay switch 130 is connected to ground, which connects the battery 110 to the bus circuit 140. Also, during normal operation of the system 100, the sensor (not shown) is continuously sensing the voltage of the battery 110. In addition, the processor (not shown) continuously compares the sensed voltage of the battery 110 with a preset voltage for the battery 110.

Figure 2:
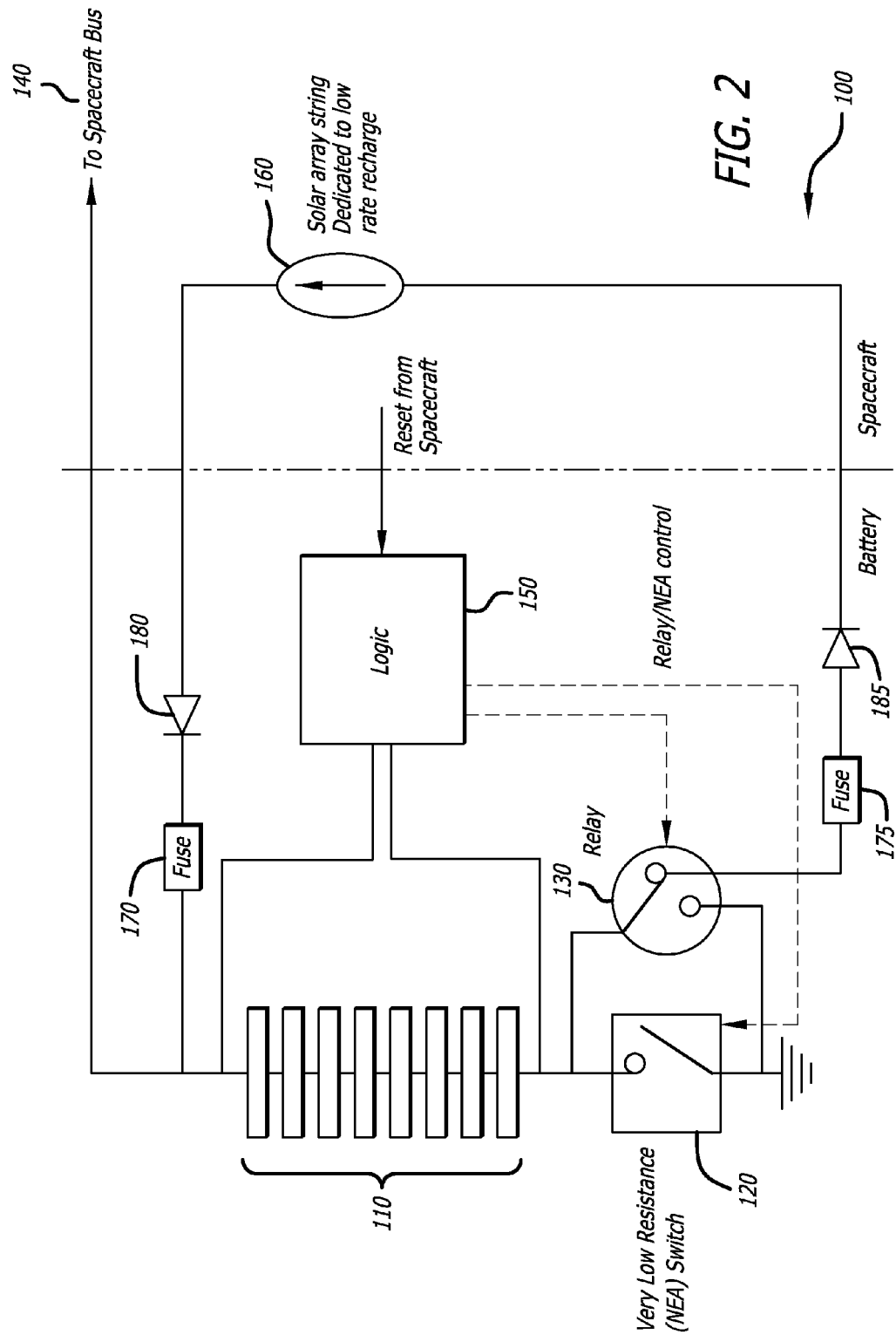
FIG. 2 is a block diagram of the disclosed system for autonomous lithium-ion battery protection with the switches in position for the battery being charged by a dedicated charging circuit, in accordance with at least one embodiment of the present disclosure.

Once the processor (not shown) determines that the voltage of the battery 110 is below the preset voltage, the switch logic 150 switches the NEA switch 120 to an open position to disconnect the battery 110 from the bus circuit 140, and the switch logic 150 switches the relay switch 120 to connect the battery 110 to the dedicated charging circuit 160. These switch positions are illustrated in FIG. 2. In particular, FIG. 2 is a block diagram of the disclosed system 100 for autonomous lithium-ion battery protection with the switches 120, 130 in position for the battery 110 being charged by the dedicated charging circuit 160. Once the switches 120, 130 have been switched, the dedicated charging circuit 160 recharges the battery 110 by providing a low rate of charge to the battery 110. The fuse 170 limits the current flow to the battery 110 to limit the charge rate to the battery 110, and the diode 180 ensures that the current flows in the appropriate direction, which is towards the battery 110.

Figure 3:
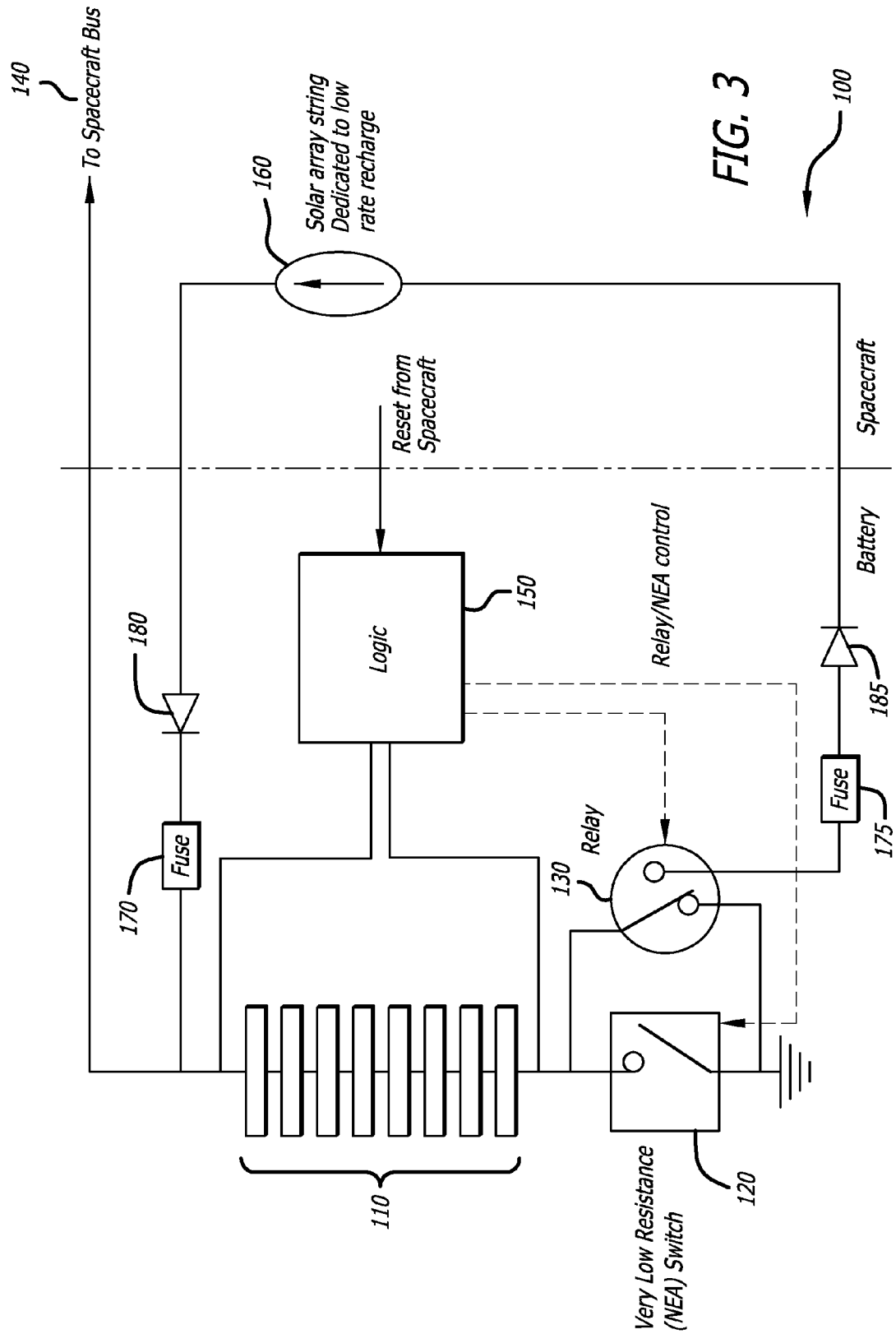
FIG. 3 is a block diagram of the disclosed system for autonomous lithium-ion battery protection with the switches in position for normal charging and discharging of the battery after the battery has been charged by the dedicated charging circuit, in accordance with at least one embodiment of the present disclosure.

Once the processor (not shown) determines that the voltage of the battery 110 exceeds the preset voltage and, thus, the battery 110 is sufficiently recharged, the switch logic 150 switches the relay switch 130 back to ground to reconnect the battery 110 to the bus circuit 140 for normal charging and discharging. These switch positions are illustrated in FIG. 3. FIG. 3 is a block diagram of the disclosed system 100 for autonomous lithium-ion battery protection with the switches 120, 130 in position for normal charging and discharging of the battery 110 after the battery 110 has been charged by the dedicated charging circuit 160.

It should be noted that since the NEA switch 120 is an ultra low resistance switch, it allows for nearly full performance of the battery 110 during normal operation when the NEA switch is in its normal closed position, as is shown in FIG. 1. However, the NEA switch 120 cannot be reset once it has been switched out of its normal closed position. As such, the relay switch 130 is used to restore normal operation of the battery 110 after the battery 110 has been sufficiently recharged. It should be noted that the relay switch 130 will cause a drop in performance of the battery 110, but it will allow the spacecraft operation to be restored.

In addition, it should be noted that some batteries have a separate battery tap to facilitate bus short clearing on a separate bus. In one or more embodiments, the disclosed system 100 may be extended to include that additional tap. In addition, it should be noted that the disconnect function, for the disclosed system 100, may be implemented either on the positive (high) side of the battery 110 or the ground (low) side of the battery, depending upon the spacecraft system design.

Figure 4:
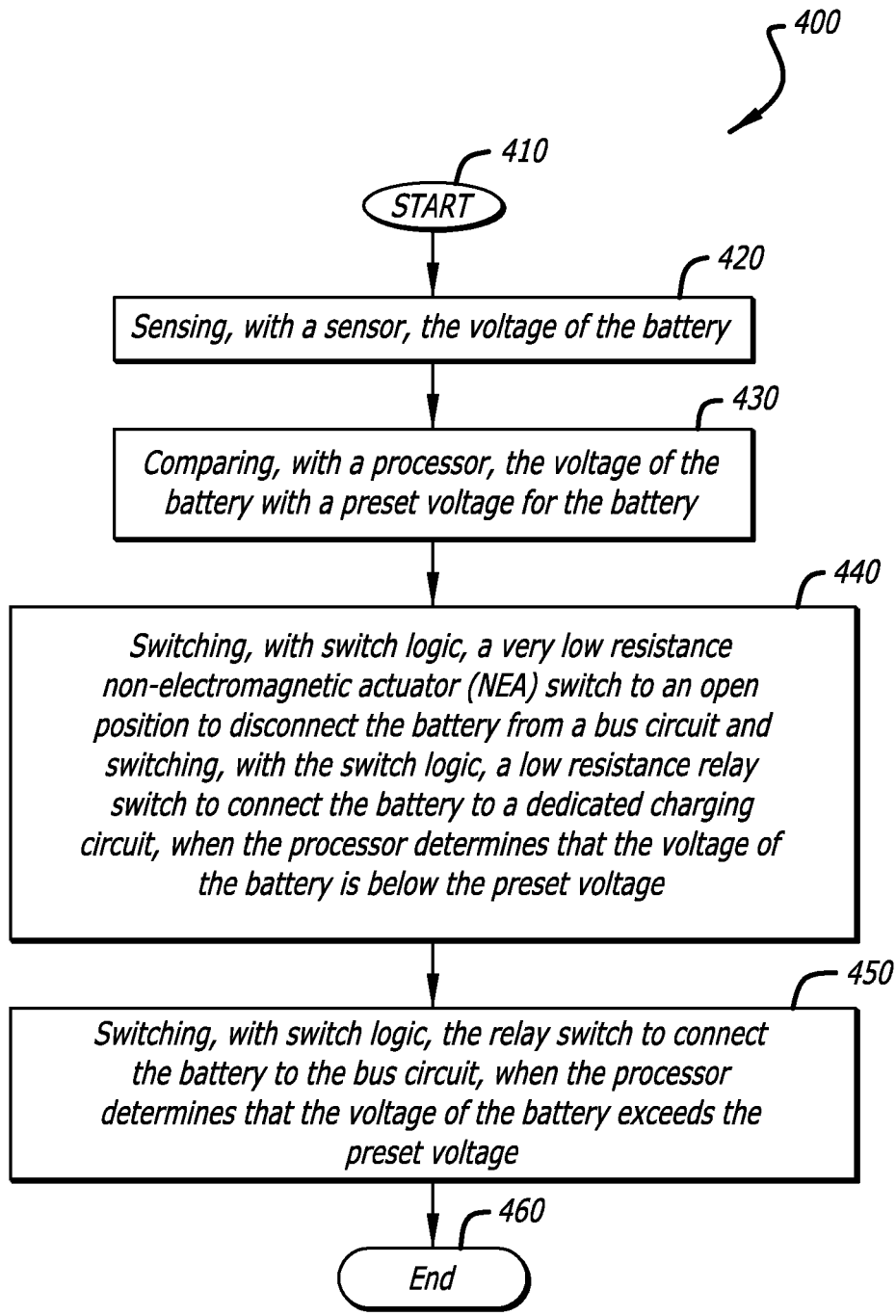
FIG. 4 is a flow chart diagram of the disclosed method for autonomous lithium-ion battery protection that follows the switching process depicted in the system block diagrams of FIGS. 1-3, in accordance with at least one embodiment of the present disclosure.

FIG. 4 is a flow chart diagram of the disclosed method 400 for autonomous lithium-ion battery protection that follows the switching process depicted in the system block diagrams of FIGS. 1-3, in accordance with at least one embodiment of the present disclosure. At the start 410 of the method 400, a sensor continuously senses the voltage of the battery 420. A processor continuously compares the voltage of the battery with a preset voltage for the battery 430. Once the processor determines that the voltage of the battery is below the preset voltage, switch logic switches a very low resistance non-electromagnetic actuator (NEA) switch to an open position to disconnect the battery from a bus circuit, and switches a low resistance relay switch to connect the battery to a dedicated charging circuit 440. Once the processor determines that the voltage of the battery exceeds the preset voltage, the switch logic switches the relay switch to connect the battery to the bus circuit 450 and, then, the method 400 ends 460.

Figure 5:
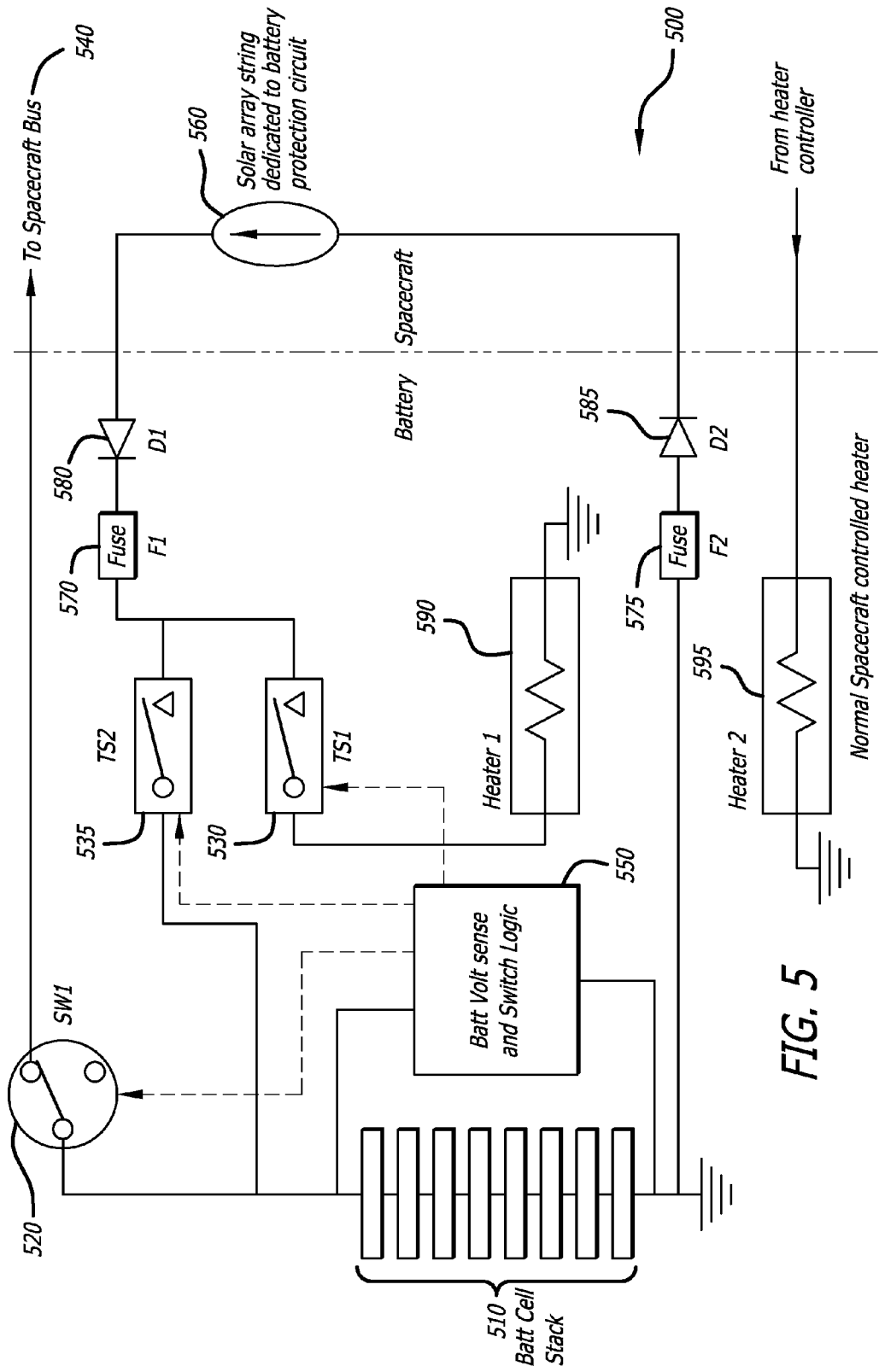
FIG. 5 is a block diagram of the disclosed system for autonomous lithium-ion battery protection including a heater for preheating of the battery for charging, where the switches are in position for normal charging and discharging of the battery, in accordance with at least one embodiment of the present disclosure.

FIG. 5 is a block diagram of the disclosed system 500 for autonomous lithium-ion battery protection including a heater 590 for preheating of the battery 510 for charging, where the switches 520, 530, 535 are in position for normal charging and discharging of the battery 510, in accordance with at least one embodiment of the present disclosure. The system 500 of FIG. 5 employs an additional heater (Heater 1) 590 that is used to protect the battery 510 from damage due to recharging at excessively cold temperatures. As such, Heater 1 590 is used to preheat the battery 510 prior to the battery 510 being recharged. In this figure, the system 500 is shown to include a battery 510, a spacecraft bus (i.e. a bus circuit) 540, switch logic 550, a bus circuit switch (SW1) 520, two thermal switches (TS1 and TS2) 530, 535, fuses 570, 575, diodes 580, 585, two heaters (Heater 1 and Heater 2) 590, 595, and a solar array sting that is dedicated to a low rate of recharge (i.e. a dedicated power source) 560.

In one or more embodiments, the battery 510 is a lithium-ion battery. It should be noted that in some embodiments, the system 500 employs a battery pack for the battery 510. Also, it should be noted that in one or more embodiments, the system 500 employs at least a portion of a solar array for the dedicated power source 560. In at least one embodiment, one or more strings of solar array cells are employed by the system 500 for the dedicated power source 560. In at least one embodiment, the battery 510, the switch logic 550, a processor (not shown), a voltage sensor (not shown), a temperature sensor (not shown), the bus circuit switch (SW1) 520, the two thermal switches (TS1 and TS2) 530, 535, the fuses 570, 575, the diodes 580, 585, and/or Heater 1 590 are housed together in a single protection circuit unit. It should be noted that in some embodiments, the processor (not shown), the voltage sensor (not shown), and the temperature sensor (not shown) are included in the switch logic 550.

During normal operation of the system 500, the battery 510 is connected to the bus circuit 540 to allow for the charging and discharging of the battery 510 through the bus circuit 540. The configuration of the switches 520, 530, 535 for normal operation is as shown in FIG. 5. In this figure, the bus circuit switch 520 is shown to be switched such that the battery 510 is connected to the bus circuit 540, and the thermal switches 530, 535 are both shown to be open such that the dedicated power source 560 is not connected to the battery 510 or the Heater 1 590. Also, during normal operation, Heater 2 595 is powered by the bus circuit 540. Heater 2 595 is used to heat the battery 510 in order to ensure that the battery 510 maintains a sufficient temperature for charging. In addition, during normal operation of the system 500, the voltage sensor (not shown) is continuously sensing the voltage of the battery 510. Additionally, the processor (not shown) continuously compares the sensed voltage of the battery 510 with a preset voltage for the battery 510.

Figure 6:
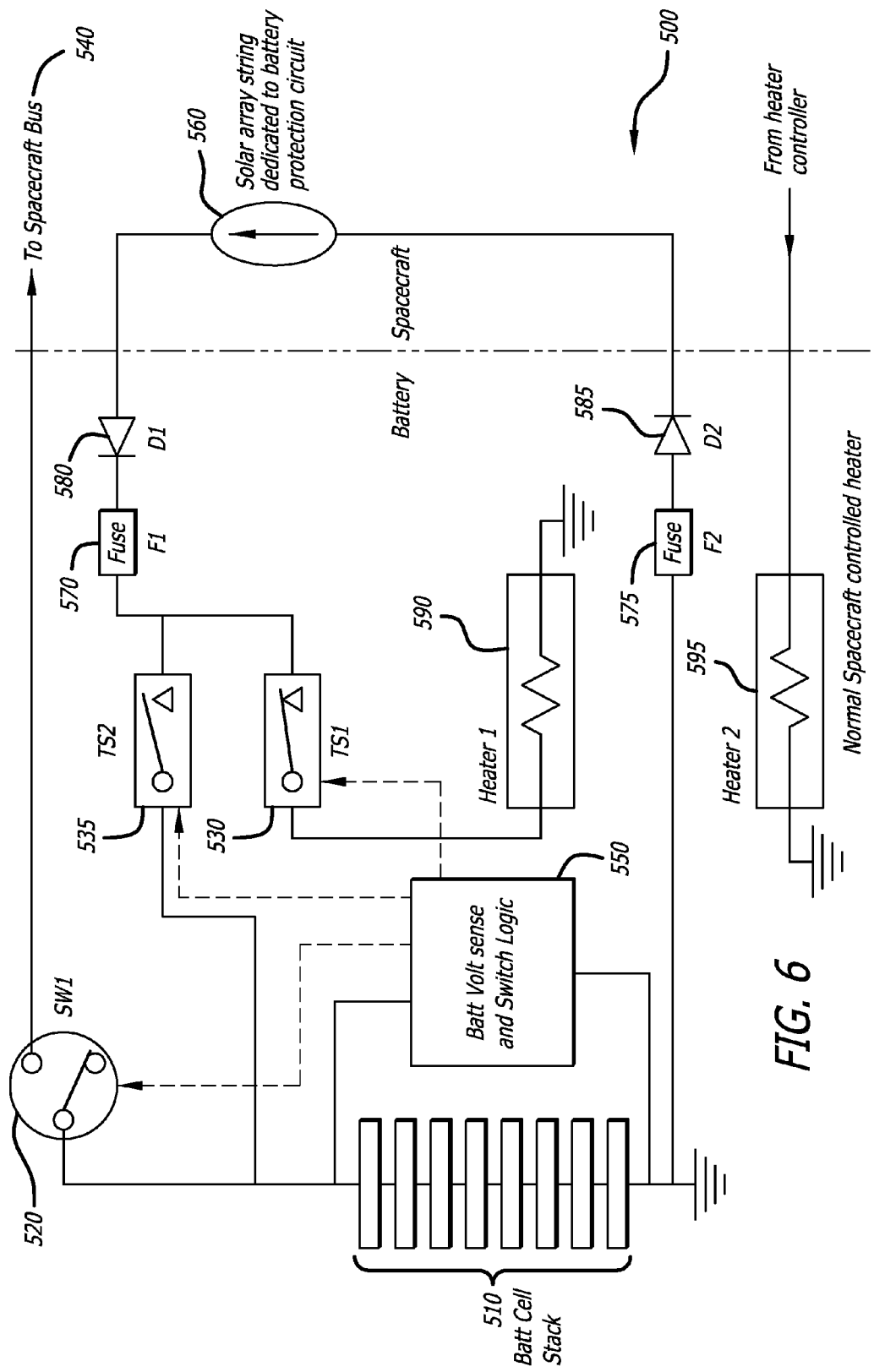
FIG. 6 is a block diagram of the disclosed system for autonomous lithium-ion battery protection including a heater for preheating of the battery for charging, where the switches are in position for the battery being preheated by the heater, in accordance with at least one embodiment of the present disclosure.

Once the processor (not shown) determines that the voltage of the battery 510 is below the preset voltage, the switch logic 550 switches the bus circuit switch 520 to disconnect the battery 550 from the bus circuit 540. A temperature sensor (not shown) continuously senses the temperature of the battery 550 to determine whether the battery 510 is too cold for recharging. The processor (not shown) compares the sensed temperature of the battery 510 with a threshold temperature of the battery 510 for recharging. Once the processor (not shown) determines that the temperature of the battery 510 is below the threshold temperature for the battery 510, the switch logic 550 switches the second thermal switch (TS2) 535 to disconnect the battery 510 from the dedicated power source 560, if it is not already disconnected, and switches the first thermal switch (TS1) 530 to connect Heater 1 590 to the dedicated power source 560. Once the first thermal switch (TS1) 530 has been switched, Heater 1 590 reheats the battery 510 to a sufficient temperature for recharging. These switch positions are illustrated in FIG. 6. In particular, FIG. 6 is a block diagram of the disclosed system 500 for autonomous lithium-ion battery protection including a heater 590 for preheating of the battery 510 for charging, where the switches 520, 530, 535 are in position for the battery 510 being preheated by the heater 590.

Figure 7:
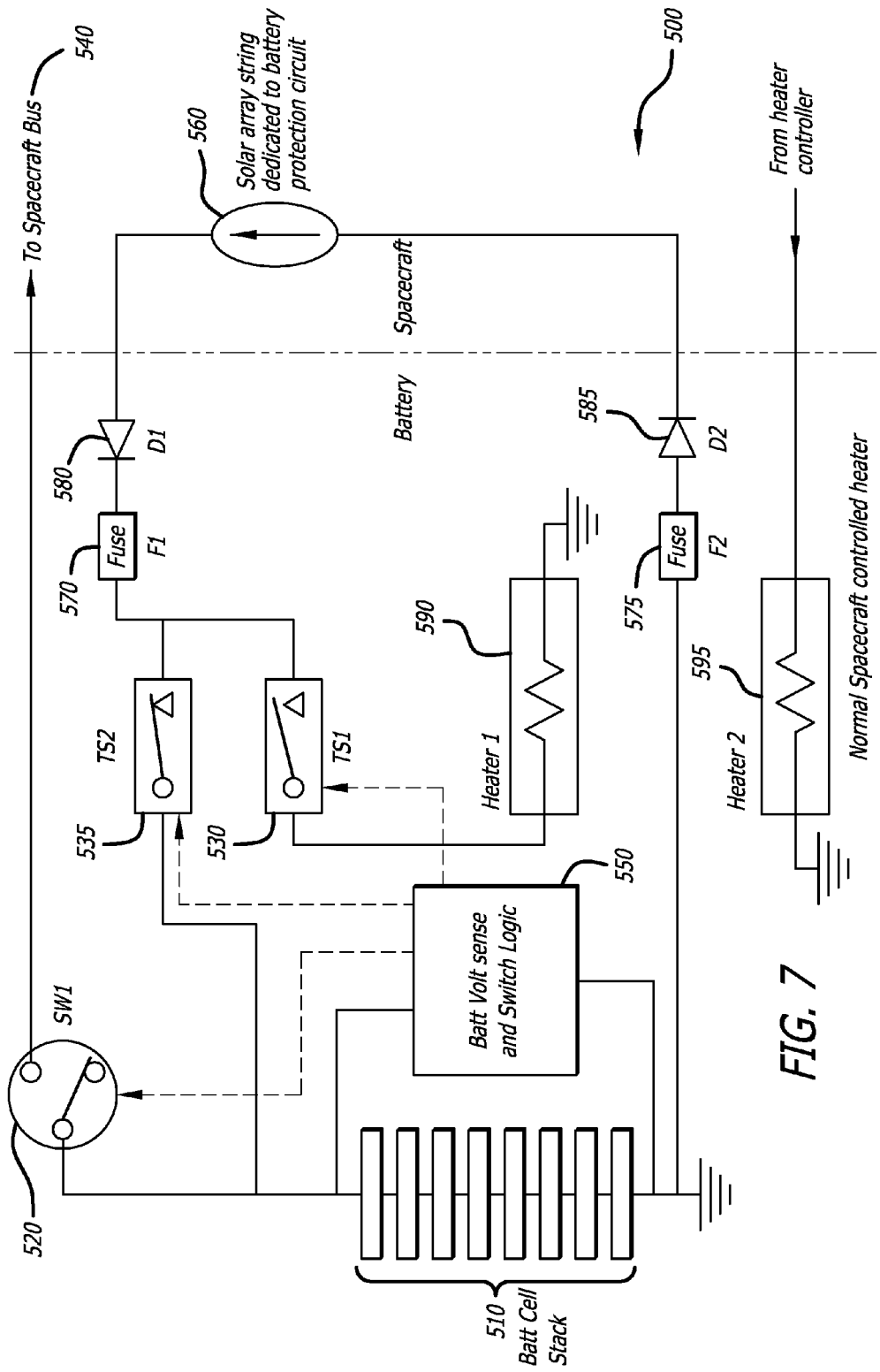
FIG. 7 is a block diagram of the disclosed system for autonomous lithium-ion battery protection including a heater for preheating of the battery for charging, where the switches are in position for the battery being charged by the dedicated power source, in accordance with at least one embodiment of the present disclosure.

Once the processor (not shown) determines that the temperature of the battery 510 exceeds the threshold temperature for the battery, the switch logic 550 switches the first thermal switch (TS1) 530 to disconnect Heater 1 from the dedicated power source 560, and switches the second thermal switch (TS2) 535 to connect the battery 510 to the dedicated power source 560. Once the switches 530, 535 have been switched, the dedicated power source 560 recharges the battery 510 by providing a low rate of charge to the battery 510. The fuse 570 limits the current flow to the battery 510 to limit the charge rate to the battery 510, and the diode 580 ensures that the current flows towards the battery 510. These switch positions are illustrated in FIG. 7. Specifically, FIG. 7 is a block diagram of the disclosed system 500 for autonomous lithium-ion battery protection including a heater 590 for preheating of the battery 510 for charging, where the switches 520, 530, 535 are in position for the battery 510 being charged by the dedicated power source 560.

After the processor (not shown) determines that the voltage of the battery exceeds the preset voltage, the switch logic 550 switches the switches 520, 530, 535 to the switch positions illustrated in FIG. 5 for normal operation of the battery 510, where the battery 510 is being normally charged and discharged by the bus circuit 540.

It should be noted that in other embodiments, the switch logic 550 is not used to switch the first thermal switch (TS1) 530 and the second thermal switch (TS2) 535. For these embodiments, the switch logic 550 is only used to switch the bus circuit switch 520. The first thermal switch (TS1) 530 and the second thermal switch (TS2) 535 simply switch themselves open and closed when they sense the change in temperature of the battery (or battery pack) 510 exceeds or is below the threshold battery temperature.

In addition, it should be noted that in other embodiments, the bus circuit switch 520 may be replaced by a very low resistance non-electromagnetic actuator (NEA) switch connected in parallel with a low resistance relay switch, similar to the configuration of the NEA switch 102 and the relay switch 130 in the embodiment depicted in FIGS. 1-3.

Figure 8:
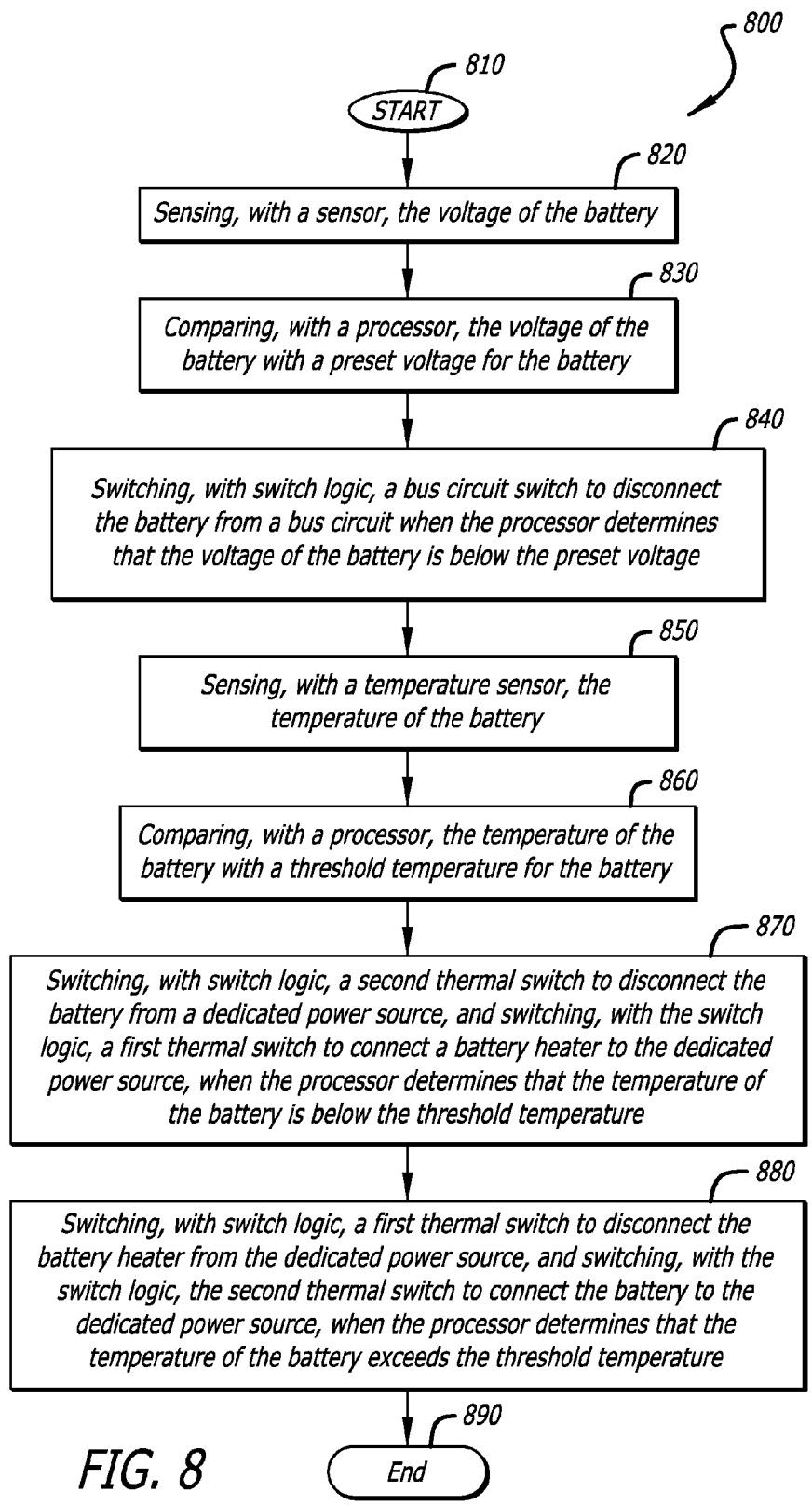
FIG. 8 is a flow chart diagram of the disclosed method for autonomous lithium-ion battery protection that follows the switching process depicted in the system block diagrams of FIGS. 5-7, in accordance with at least one embodiment of the present disclosure.

FIG. 8 is a flow chart diagram of the disclosed method 800 for autonomous lithium-ion battery protection that follows the switching process depicted in the system block diagrams of FIGS. 5-7, in accordance with at least one embodiment of the present disclosure. At the start 810 of the method 800, a sensor continuously senses the voltage of the battery 820. A processor continuously compares the voltage of the battery with a preset voltage for the battery 830. Once the processor determines that the voltage of the battery is below the preset voltage, switch logic switches a bus circuit switch to disconnect the battery from the bus circuit 840.

A temperature sensor continuously senses the temperature of the battery 850. A processor then compares the sensed temperature of the battery with a threshold temperature of the battery for recharging 860. Once the processor determines that the temperature of the battery is below the threshold temperature of the battery, the switch logic switches a second thermal switch to disconnect the battery from a dedicated power source, and switches a first thermal switch to connect a battery heater to the dedicated power source 870. Once the processor determines that the temperature of the battery exceeds the threshold temperature of the battery, the switch logic switches the first thermal switch to disconnect the battery heater from the dedicated power source, and switches the second thermal switch to connect the battery to the dedicated power source 880 for recharging and, then, the method 800 ends 890.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. An autonomous regulation method for a battery, the method comprising:
    sensing a voltage of the battery;
    comparing, with a processor, the voltage of the battery with a preset voltage for the battery; and
    selectively controlling a very low resistance non-electromagnetic actuator (NEA) switch which is a one-time switch to disconnect the battery from a bus circuit and,
    selectively controlling a low resistance relay switch to connect the battery to a dedicated charging circuit, when the processor determines that the voltage of the battery is below the preset voltage,
    wherein the sensing, comparing, and controlling operate autonomously within the battery.

2. The method of claim 1, wherein the method further comprises:
    selectively controlling the relay switch to connect the battery to the bus circuit, when the processor determines that the voltage of the battery exceeds the preset voltage.

3. The method of claim 1, wherein the dedicated charging circuit comprises at least a portion of a solar array.

4. The method of claim 3, wherein the portion of the solar array is at least one string of solar cells.

5. The method of claim 1, wherein the battery, the processor, the NEA switch, and the relay switch are housed together in a single unit.

6. The method of claim 1, wherein the battery is on a spacecraft.

7. The method of claim 1, wherein the battery is a lithium-ion battery.

8. An autonomous regulation system for a battery, the system comprising:
    a sensor configured to sense a voltage of the battery;
    a processor configured to compare the voltage of the battery with a preset voltage for the battery;
    switch logic configured to switch a very low resistance non-electromagnetic actuator (NEA) switch which is a one-time switch to disconnect the battery from a bus circuit, and configured to switch a low resistance relay switch to connect the battery to a dedicated charging circuit, when the processor determines that the voltage of the battery is below the preset voltage,
    wherein the sensing, comparing, and controlling operate autonomously within the battery.

9. The system of claim 8, wherein the switch logic is further configured to switch the relay switch to connect the battery to the bus circuit, when the processor determines that the voltage of the battery exceeds the preset voltage.

10. The system of claim 8, wherein the dedicated charging circuit comprises at least a portion of a solar array.

11. The system of claim 10, wherein the portion of the solar array is at least one string of solar cells.

12. The system of claim 8, wherein the battery, the sensor, the processor, the switch logic, the NEA switch, and the relay switch are housed together in a single unit.

13. The system of claim 8, wherein the battery is on a spacecraft.

14. The system of claim 8, wherein the battery is a lithium-ion battery.

15. An autonomous regulation method for a battery, the method comprising:
    sensing a voltage of the battery;
    comparing the voltage of the battery with a preset voltage for the battery;
    selectively controlling a bus circuit switch to disconnect the battery from a bus circuit when the voltage of the battery is below the preset voltage;
    sensing a temperature of the battery;
    comparing the temperature of the battery with a threshold temperature for the battery; and
    selectively controlling a second thermal switch to disconnect the battery from a dedicated power source, and selectively controlling a first thermal switch to connect a battery heater to the dedicated power source, when the temperature of the battery is below the threshold temperature, wherein the sensing, comparing, and controlling operate autonomously within the battery.

16. The method of claim 15, wherein the method further comprises:

selectively controlling the first thermal switch to disconnect the battery heater from the dedicated power source, and selectively controlling the second thermal switch to connect the battery to the dedicated power source, when the temperature of the battery exceeds the threshold temperature.

17. The method of claim 15, wherein the dedicated power source comprises at least a portion of a solar array.

18. The method of claim 17, wherein the portion of the solar array is at least one string of solar cells.

19. The method of claim 15, wherein the battery, the bus circuit switch, the first thermal switch, the second thermal switch, and the battery heater are housed together in a single unit.

20. The method of claim 15, wherein the battery is on a spacecraft.

21. The method of claim 15, wherein the battery is a lithium-ion battery.

22. An autonomous regulation system for a battery, the system comprising:

a voltage sensor configured to sense a voltage of the battery;

at least one processor configured to compare the voltage of the battery with a preset voltage for the battery;

switch logic configured to switch a bus circuit switch to disconnect the battery from a bus circuit when the first processor determines that the voltage of the battery is below the preset voltage;

a temperature sensor configured to sense a temperature of the battery;

the at least one processor configured to compare the temperature of the battery with a threshold temperature for the battery;

a second thermal switch configured to disconnect the battery from a dedicated power source, when the second processor determines that the temperature of the battery is below the threshold temperature; and a first thermal switch configured to connect a battery heater to the dedicated power source, when the second processor determines that the temperature of the battery is below the threshold temperature, wherein the sensing, comparing, and controlling operate autonomously within the battery.

23. The system of claim 22, wherein the first thermal switch is further configured to disconnect the battery heater from the dedicated power source, when the second processor determines that the temperature of the battery exceeds the threshold temperature; and the second thermal switch is further configured to connect the battery to the dedicated power source, when the second processor determines that the temperature of the battery exceeds the threshold temperature.

24. The system of claim 22, wherein the dedicated power source comprises at least a portion of a solar array.

25. The system of claim 24, wherein the portion of the solar array is at least one string of solar cells.

26. The system of claim 22, wherein the battery, the voltage sensor, the first processor, the second processor, the temperature sensor, the switch logic, the bus circuit switch, the first thermal switch, the second thermal switch, and the battery heater are housed together in a single unit.

27. The system of claim 22, wherein the battery is on a spacecraft.

28. The system of claim 22, wherein the battery is a lithium-ion battery.

29. The system of claim 22, wherein the at least one processor configured to compare the temperature of the battery with the threshold temperature for the battery is at least one second processor.

* * * * *